June 24, 1930.  G. ERICSSON  1,765,717
HIGH DUTY VALVE STRUCTURE
Filed April 23, 1927   2 Sheets-Sheet 2

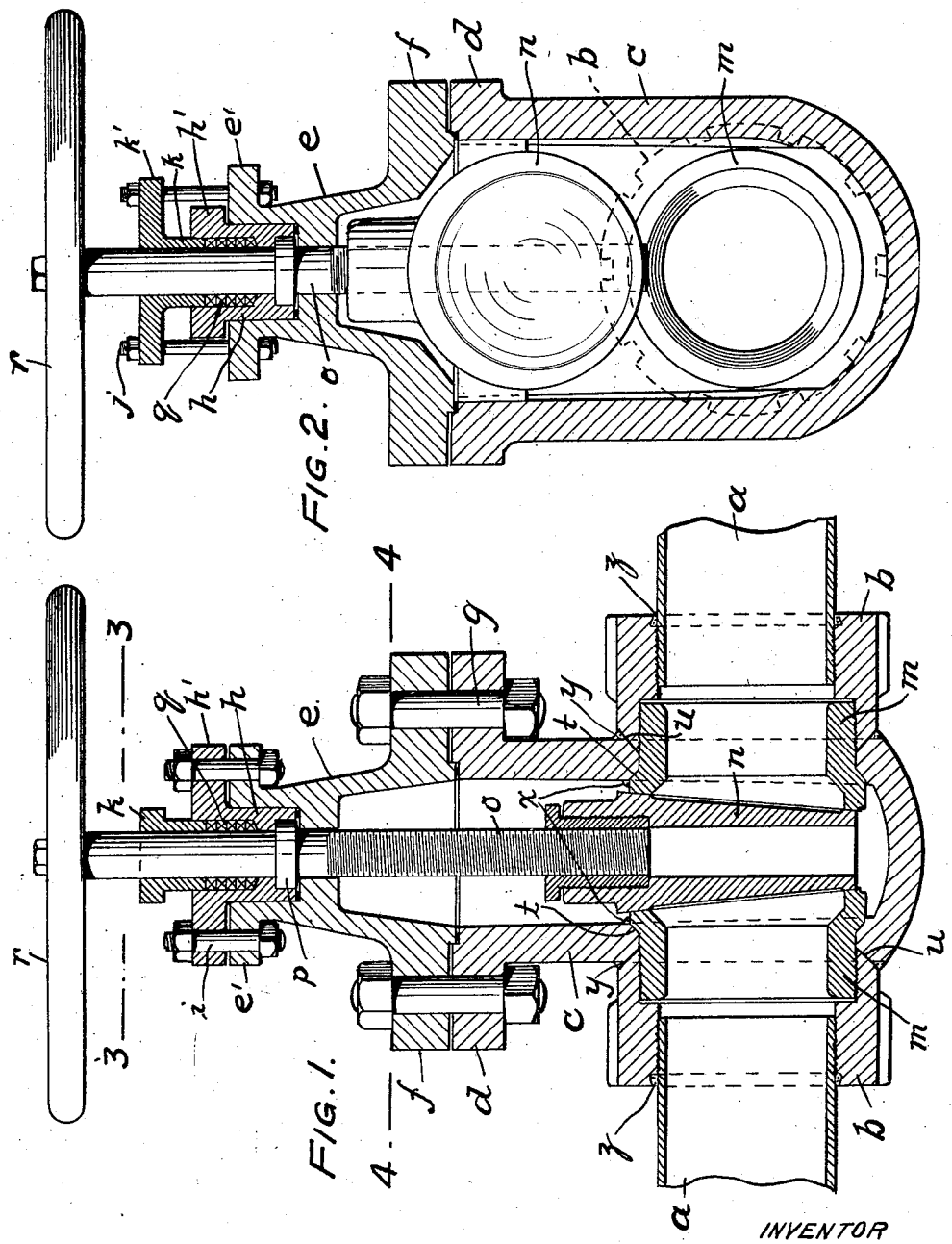

WITNESS:

INVENTOR
Gunnar Ericsson
BY
Busser and Harding
ATTORNEYS.

Patented June 24, 1930

1,765,717

UNITED STATES PATENT OFFICE

GUNNAR ERICSSON, OF PHILADELPHIA, PENNSYLVANIA

HIGH-DUTY-VALVE STRUCTURE

Application filed April 23, 1927. Serial No. 186,016.

The object of my invention is to provide a valve that will be adapted to control high pressure fluids, as, for example, heavy duty valves used in oil well drilling. In these valves, the valve casing and appurtenant parts must be made of great strength and necessarily, also, of great size, and to this end, it has been deemed necessary to expand the valve casing and cover to a very considerable diameter and to unite them along their circumferences by a large number of heavy bolts arranged in a continuous circumferential row.

One of the objects of my invention is to improve a valve of this type by a construction that effects a substantial reduction in weight, in lateral dimensions and in the number of bolts required to unite the casing and cap, without sacrifice of strength and other qualities required, whereby the expense of construction may be materially reduced and the work of setting up the valve simplified. Another object of the invention is to strengthen and simplify the connection between said cover and the cap and gland that surmount it. The construction shown in the accompanying drawings represents one embodiment of my invention, wherein the objects above recited are attained in a high degree, although it will be understood that the illustrated construction embodies specific features that are not essential characteristics of my generic invention.

In the drawings:

Fig. 1 is an elevational section through the valve structure.

Fig. 2 is a similar view, being a section through the center of Fig. 1 except that the valve is shown in full lines.

Figure 3:
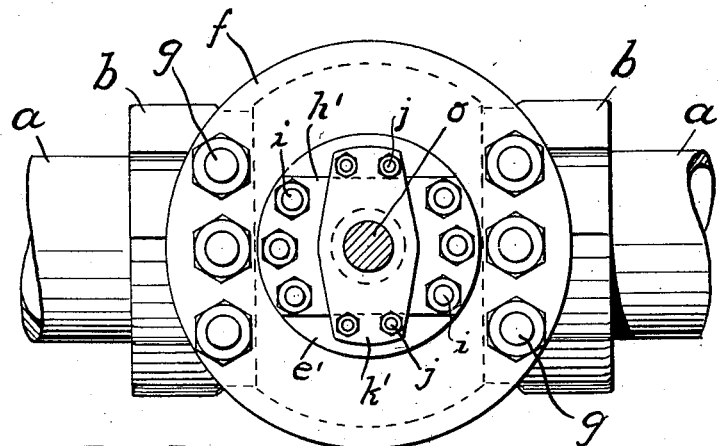
Fig. 3 is a section on the line 3—3 of Fig. 2.
Figure 4:
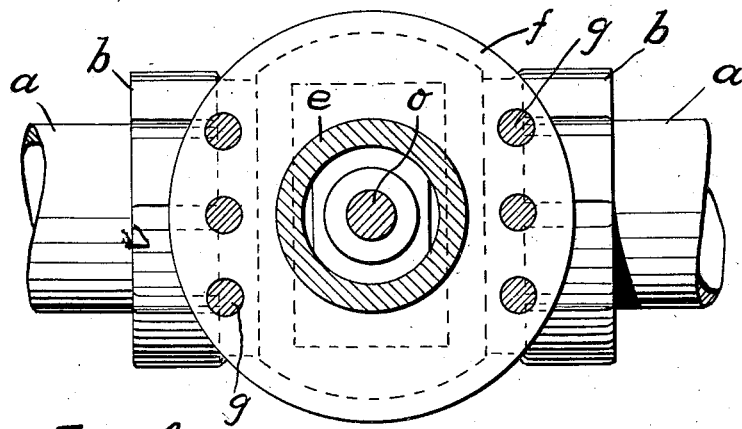
Fig. 4 is a section on the line 4—4 of Fig. 2.

The valve body $c$ is provided on opposite sides with aligning openings within which are secured the circular valve seats $m$, $m$. The ends of the valve seats projecting beyond the body are threaded to receive rings $b$, $b$, which are screwed on the seats until they abut against the body $c$ and thereby function as nuts to hold the valve seats in position. The rings $b$, $b$ are internally threaded to receive pipes $a$, $a$.

The valve body is substantially oblong in horizontal section throughout its height and is provided at the top with an outwardly extending flange $d$ whose periphery is circular and which therefore projects a relatively great distance beyond the wider flat sides of the body and a relatively short distance (or permissibly not at all) beyond its narrower curved sides. Substantially, the casing may be said to have two wings projecting from the opposite flat sides thereof.

Superposed on the body is a cover $e$ provided at its base with an outwardly extending peripheral flange $f$ of the same circumference as that of the flange $d$ of the casing. Flange $f$ therefore overlies the curved sides of the body and also the oppositely located wide parts of flange $d$ and is bolted to flange $d$ by means of bolts $g$.

The upper part of cover $e$ encloses the body of a cap $h$, which extends above the top of the cover and is provided with a diametrically extending flange $h'$ which overlies a portion of a circular flange $e'$ at the upper end of the cover. Opposite ends of flange $h'$ are bolted to the cover flange $e'$ by means of bolts $i$.

The valve $n$ is disc-shaped and is tapered toward its lower end to have a wedge-like engagement with the corresponding inclined oppositely facing walls of the valve seats $m$, $m$. The valve may be applied to its rod or stem in any of the known ways. It is shown as threaded on the rod $o$, which extends up through the top of cover $e$ and through the cap $h$, either integrally or by an interposed nut. Just above the top of cover $e$ the rod is provided with a collar $p$, the cap $h$ being cut away to receive the collar. The rod also extends through packing $q$ within cap $h$ and through a gland $k$. At the top rod $o$ is provided with a hand-wheel $r$, by means of which the rod may be turned in one direction or the other to seat or unseat the valve $n$ on its seats $m$. Gland $k$ is provided at the top with a diametrically extending flange $k'$ (extending at right angles to flange $h'$) which is directly bolted to the flange $e'$ of cover $e$ by means of bolts $j$.

The principal feature of novelty included in the foregoing description is the provision of a body that at the top is oblong in cross-section and is provided on its opposite long sides with wings which receive the bolts by means of which the cover is secured to the body. More specifically, the oblong body is provided with an external flange of circular periphery whose diameter is substantially greater than that of the distance between the flat sides of the body, but not substantially greater than (by which I mean to include a diameter about the same as) the circular diameter of the body $c$; the bolts being secured only to the parts of the flange that overhang the opposite flat sides of the casing. It has been found that three bolts $g$ on each side are adequate. In valve structures which structures embodying my invention have displaced, the body was expanded at its upper end into a circular form and the cover expanded correspondingly and circular flanges of uniform width surrounding casing and cover were united by a complete circumferential row of bolts, often as many as twenty-four.

The construction embodying my invention is obviously more compact, lighter and simpler; but tests have demonstrated that its strength is fully equal to that of the structure that I have superseded.

The connection between the cover $e$, cap $h$ and gland $k$, whereby the cover and cap are bolted together by means of bolts arranged on opposite sides of the diametric flange on the top of the gland, while the gland is bolted direct to the flange of the cover by means of bolts extending from opposite ends of the gland flange, also achieves a substantial simplification of the structure without sacrifice of security and efficiency.

Figure 5:
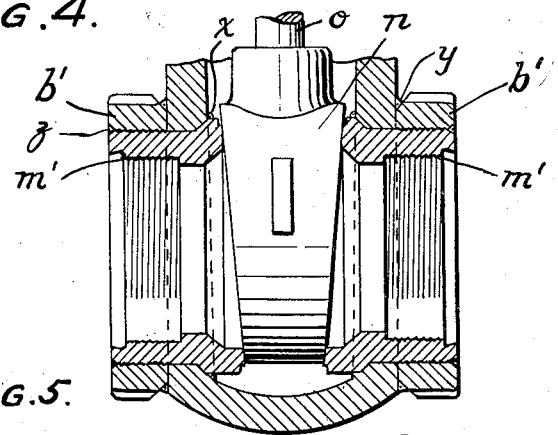
Fig. 5 is a vertical section through the valve, valve seat and adjacent part of the valve casing, the construction being a modification of that of Fig. 1.

In the constructions shown in Figs. 1 and 5, a weld $x$ is applied at the joint between the inner wall of the casing and the upper wall of each valve seat, and another weld $y$ is applied at the joint between the outer wall of the casing and the outer wall of each ring $b$.

In both figures, also, the inner end of each valve seat $m$ is expanded and shaped to provide an outwardly facing tapered shoulder or bevel engaging a corresponding taper or bevel along the inside circumferential edge of the valve seat receiving opening in the casing, as shown at $t$, Figs. 1 and 5; the weld $x$ being applied at the joint between these tapers. Weld $x$, however, need not extend throughout the circumference of the joint, the purpose of the weld being, not to protect the joint against leakage but to prevent the valve seat from turning in the valve casing.

It is preferred to taper or bevel the outside circumferential edge of each valve seat receiving opening in the casing and to provide the inner end of each ring $b$ with a corresponding taper or bevel, as shown in Fig. 1 at $u$.

The difference between the structures shown in Fig. 1 and in Fig. 5 is that in the former, ring $b$ extends beyond the valve seat and carries the pipe $a$, and opportunity is afforded for direct leakage from within the fluid conduit to between the valve seat and the ring; whereas in the structure shown in Fig. 5, the valve seat (lettered $m'$) connects direct with the pipe and there can be no direct leakage from the conduit to between the valve seat and the ring (lettered $b'$).

In both structures, the outer end of each ring is circumferentially recessed along its inner edge to receive a weld $z$.

Having now fully described my invention, what I claim and desire to protect by Letters Patent is:

A valve structure comprising a valve body, valve seats therein, a valve between said seats, a cover mounted on the body, an annular member extending upward from the top of the cover, an annular cap a major part of the length of whose body extends within the annular cover member, a gland extending within the annular cap, a valve rod extending upward through and beyond the annular member, the annular cap and the gland, a flange on the upper part of the annular member, flanges extending from opposite sides of the upper part of the cap, flanges extending from opposite sides of the gland, bolts connecting the flange on the annular member and the cap flanges, and bolts connecting the flange on the annular member and the gland flanges; the construction affording a long guiding bearing between the cover and cap which, in the bolting of the cap on the cover, prevents angular displacement of the axis of the cap relatively to the axis of the rod.

In testimony of which invention, I have hereunto set my hand, at Philadelphia, Pa., on this 13th day of April, 1927.

GUNNAR ERICSSON.